United States Patent Office 2,852,484
Patented Sept. 16, 1958

2,852,484

PROCESS FOR COMPOUNDING SILICONE GUM, SILICA, AND A DIHYDRIC ALCOHOL AND PRODUCT OBTAINED

Norman New, Johnstone, Scotland, assignor to Imperial Chemical Industries Limited, London, England, a corporation of Great Britain No Drawing. Application September 7, 1956
Serial No. 608,426

Claims priority, application Great Britain November 7, 1955

16 Claims. (Cl. 260—33.4)

The present invention relates to improvements in or relating to silicone gums and more particularly to compounded silicone gums, that is to say silicone rubber compounds.

It is desirable to be able to load silicone gums with large quantities of reinforcing fillers, that is to say finely divided fillers, so as to produce a silicone gum, that is to say a silicone rubber compound, which can be reworked after storage for considerable periods prior to curing or vulcanising in order to produce a reinforced cured silicone gum, that is to say a silicone elastomer. In the compounding of silicone gums it is not possible to incorporate more than a small quantity of a very finely divided silica, that is to say a silica having a particle size of up to the order of 25 millimicrons and a specific surface of the order of at least 150 square metres/gram, for example "Aerosil" (which is a fumed acidic silica of particle size 15 to 20 millimicrons and specific surface 175 to 200 square metres gram) without causing the compounded silicone gum to be unworkable or to become unworkable if stored for any length of time prior to curing. If more than a very limited amount of such a silica is incorporated into the silicone gum it is usually necessary that the final working before curing should take place very soon after the compounding owing to "structure build-up." It is thus not possible to introduce large quantities of such finely divided silica into a silicone gum in order to obtain after a few weeks storage a reinforced silicone elastomer having an increased tensile strength and desired hardness.

By the term "acidic silica" is meant a silica having some silicic acid groupings.

It has now been found that if a quantity of a dihydric alcohol of the general formula

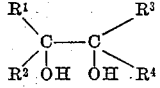

where $R^1$ and $R^3$ are hydrogen or alkyl groups containing not more than 6 carbon atoms or aryl groups containing 6 carbon atoms and $R^2$ and $R^4$ are alkyl groups containing not more than 3 carbon atoms is included as an additive in a silicone gum it is possible to introduce said silica in the silicone gum to produce satisfactory compounded silicone gums, that is to say silicone rubber compounds, which can be stored for several weeks before reworking. It has also been found that in order to obtain the desired increase in tensile strength, improved elongation at break and improved hardness in the silicone elastomer it is desirable that 100 parts of the silicone gum should include between 20 and 50 parts of said silica.

If less than 20 parts of said silica per 100 parts of the silicone gum are included the desired improved properties of the silicone elastomer are not sufficiently pronounced and if more than 50 parts of said silica per 100 parts of said silicone gum are included the silicone elastomer becomes brittle and fails to have a satisfactory elongation at break.

Furthermore it has also been found that at least 1% of said additive is required for the thus compounded silicone gum to have the required storage and milling properties and that if more than 10% of any one of these additives is included the resulting componded silicone gum has a tendency on being worked to stick to the rollers of the mill and furthermore the elastomer produced on curing will tend to be spongy.

According to the present invention a compounded silicone rubber comprises a silicone gum, 20 to 50 parts of a silica having a particle size of up to the order of 25 millimicrons and a specific surface of the order of at least 150 square metres/gram per 100 parts of the silicone gum and 1 to 10% on the compounded silicone gum of an additive defined as aforesaid.

The process of the present invention for the compounding of a silicone gum with silica having a particle size of up to the order of 25 millimicrons and a specific surface of the order of at least 150 square metres/gram comprises incorporating 20 to 50 parts of said silica per 100 parts of the silicone gum in the presence of 1 to 10% on the resulting compounded silicone composition of an additive as hereinbefore defined.

Additives suitable for the production of the compositions of the invention include pinacol, 1:2 dimethyl-1:2 diethylethyleneglycol, 1:1:2 trimethyl-2 ethylethyleneglycol, tetraethylethyleneglycol, 1:1 dimethyl-2:3 diethylethyleneglycol, 1:1:2 triethyl-2 methylethyleneglycol.

Said silica may be treated with for example silanes or halogeno-silanes prior to its inclusion in the compositions of the invention.

The compounded silicone gums of the invention can be stored for considerable periods, for example up to 12 weeks, and easily worked prior to using, whereas it has previously been found necessary to carry out the final working and curing within a relatively short time, for example 24 hours of compounding.

The invention is illustrated by the following examples in which all parts are by weight.

*Example 1*

100 parts of a dimethylsiloxane gum having a methyl to silicon ratio of 2:1 and a viscosity of $1.7 \times 10^7$ centistokes at 20° C. are mixed on cold differential rolls with 35 parts "Aerosil," 2.5 parts pinacol and 3 parts of benzoyl peroxide/polysiloxane oil paste. The composition so obtained can be easily worked after storage for 3 weeks whereas a similar composition without additive cannot be reworked after that time.

The compounded silicone gums with and without additives are cured for various times and the tensile strength, elongation at break and hardness for the resulting silicone elastomers are determined and recorded in the following table.

| Sample No. | Quantity of additive added (parts) | Period of storage at room temp. before processing and testing (weeks) | Oven cure | | Tensile strength (lb./sq. in.) | Elongation at break (percent) | Hardness (B. S. deg.) |
|---|---|---|---|---|---|---|---|
| | | | Time (hr.) | Temp. (°C.) | | | |
| 1 | 0 | 0 | 1 | 150 | 640 | 340 | 67 |
| | | | 24 | 250 | 545 | 360 | 67 |
| | | 3 | Unworkable | | | | |
| 2 | 2.5 | 0 | 1 | 150 | 820 | 440 | 70 |
| | | | 24 | 250 | 560 | 330 | 75 |
| | | 3 | 1 | 150 | 780 | 325 | 71 |
| | | | 24 | 250 | 760 | 280 | 76 |

Example 2

A compounded silicone gum is prepared as in Example 1 except that the 2.5 parts of pinacol are replaced by 2.5 parts of 1:2 dimethyl-1:2 diethylethyleneglycol. The compounded silicone gum so obtained can be easily worked after storage for 3 weeks and on curing at 150° C. for one hour the resulting elastomer has a tensile strength at 797 lb./sq. in., elongation at break 400% and hardness 64 B. S. degrees. A further sample of the compounded silicone gum which is cured at 250° C. for 24 hours gives an elastomer having a tensile strength of 685 lb./sq. in., elongation at break 340% and hardness 68 B. S. degrees.

Example 3

A compounded silicone gum is prepared as in Example 1 except that the 35 parts of "Aerosil" are replaced by 20 parts. The compounded silicone gum so obtained can be easily worked after storage for 3 weeks and on curing at 150° C. for one hour the resulting elastomer has a tensile strength of 600 lb./sq. in., elongation at break 370% and hardness 50 B. S. degrees. A further sample of the compounded silicone gum which is cured for an additional period of 24 hours at 250° C. gives an elastomer having a tensile strength of 520 lb./sq. in., elongation at break 270% and hardness 51 B. S. degrees.

Example 4

A compounded silicone gum is prepared as in Example 1 except that the 2.5 parts of pinacol are replaced by 7.5 parts and the 35 parts of "Aerosil" are replaced by 50 parts. The compounded silicone gum so obtained can be worked after storage for 3 weeks and on curing at 150° C. for one hour the resulting elastomer has a tensile strength of 830 lb./sq. in., elongation at break 280% and hardness 83 B. S. degrees. A further sample of the compounded silicone gum which is cured for an additional period of 24 hours at 250° C. gives an elastomer having a tensile strength of 500 lb./sq. in., elongation at break 130% and hardness 89 B. S. degrees.

What I claim is:

1. A compounded silicone rubber comprising a silicone gum, 20 to 50 parts silica having a particle size of up to the order of 25 millimicrons and a specific surface of the order of at least 150 square metres per gram per 100 parts of the silicone gum and 1 to 10% on the compounded silicone gum of an additive of the general formula

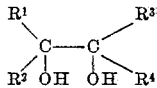

where $R^1$ and $R^3$ are selected from the group consisting of hydrogen, alkyl groups containing not more than 6 carbon atoms and aryl groups containing 6 carbon atoms, and $R^2$ and $R^4$ are alkyl groups containing not more than 3 carbon atoms.

2. A compounded silicone rubber as claimed in claim 1 wherein the silica is a fumed acidic silica of a particle size of 15 to 20 millimicrons and a specific surface of 175 to 200 square meters per gram.

3. A compounded silicone rubber as claimed in claim 1 wherein the additive is pinacol.

4. A compounded silicone rubber as claimed in claim 1 wherein the additive is 1:2 dimethyl-1:2 diethylethyleneglycol.

5. A compounded silicone rubber as claimed in claim 1 wherein the additive is 1:1:2 trimethyl-2 ethylethyleneglycol.

6. A compounded silicone rubber as claimed in claim 1 wherein the additive is tetramethylethyleneglycol.

7. A compounded silicone rubber as claimed in claim 1 wherein the additive is 1:1 dimethyl-2:2 diethylethyleneglycol.

8. A compounded silicone rubber as claimed in claim 1 wherein the additive is 1:1:2 triethyl-2 methylethyleneglycol.

9. A process for the compounding of a silicone gum with silica having a particle size of up to the order of 25 milimicrons and a specific surface of the order of at least 150 square metres per gram which comprises incorporating 20 to 50 parts of said silica per 100 parts of the silicone gum in the presence of 1 to 10% on the resulting compounded silicone composition of an additive of the general formula

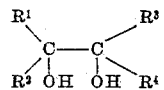

where $R^1$ and $R^3$ are selected from the group consisting of hydrogen, alkyl groups containing not more than 6 carbon atoms and aryl groups containing 6 carbon atoms and $R^2$ and $R^4$ are alkyl groups containing not more than 3 carbon atoms.

10. A process as claimed in claim 9 wherein the silica is a fumed acidic silica of a particle size of 15 to 20 millimicrons and a specific surface of 175 to 200 square meters per gram.

11. A process as claimed in claim 9 wherein the additive is pinacol.

12. A process as claimed in claim 9 wherein the additive is 1:2 dimethyl-1:2 diethylethyleneglycol.

13. A process as claimed in claim 9 wherein the additive is 1:1:2 trimethyl-2 ethylethyleneglycol.

14. A process as claimed in claim 9 wherein the additive is tetraethylethyleneglycol.

15. A process as claimed in claim 9 wherein the additive is 1:1 dimethyl-2:2 diethylethyleneglycol.

16. A process as claimed in claim 9 wherein the additive is 1:1:2 triethyl-2 methylethyleneglycol.

No references cited.